United States Patent
Lee et al.

(10) Patent No.: US 11,484,841 B2
(45) Date of Patent: Nov. 1, 2022

(54) FEED SPACER HAVING THREE-LAYERED STRUCTURE, AND REVERSE OSMOSIS MEMBRANE FILTER MODULE INCLUDING SAME

(71) Applicant: LG CHEM, LTD., Seoul (KR)

(72) Inventors: Ayoung Lee, Daejeon (KR); Dae Hun Kim, Daejeon (KR); Bumjoo Kim, Daejeon (KR); Chong Kyu Shin, Daejeon (KR); Phill Lee, Daejeon (KR); Kyunghoon Min, Daejeon (KR)

(73) Assignee: LG CHEM, LTD., Seoul (KR)

( * ) Notice: Subject to any disclaimer, the term of this patent is extended or adjusted under 35 U.S.C. 154(b) by 67 days.

(21) Appl. No.: 16/618,958

(22) PCT Filed: Oct. 17, 2018

(86) PCT No.: PCT/KR2018/012230
§ 371 (c)(1),
(2) Date: Dec. 3, 2019

(87) PCT Pub. No.: WO2019/078604
PCT Pub. Date: Apr. 25, 2019

(65) Prior Publication Data
US 2020/0086276 A1     Mar. 19, 2020

(30) Foreign Application Priority Data
Oct. 20, 2017 (KR) .......................... 10-2017-0136495

(51) Int. Cl.
*B01D 63/10* (2006.01)
*B01D 61/02* (2006.01)
(Continued)

(52) U.S. Cl.
CPC ........... *B01D 63/10* (2013.01); *B01D 61/025* (2013.01); *B01D 61/08* (2013.01); *B01D 61/10* (2013.01);
(Continued)

(58) Field of Classification Search
CPC ...... B01D 63/10; B01D 61/025; B01D 61/08; B01D 61/10; B01D 2313/143;
(Continued)

(56) References Cited

U.S. PATENT DOCUMENTS

| 4,213,858 A | 7/1980 | Boberg et al. |
| 6,113,782 A | 9/2000 | Leonard |

(Continued)

FOREIGN PATENT DOCUMENTS

| CN | 103316590 | 9/2013 |
| CN | 206103722 | 4/2017 |

(Continued)

OTHER PUBLICATIONS

Rhombus-Wolfram-MathWorld https://mathworld.wolfram.com/Rhombus.html (Year: NONE).*

(Continued)

*Primary Examiner* — Liam Royce
(74) *Attorney, Agent, or Firm* — Dentons US LLP

(57) ABSTRACT

Provided is a feed spacer having a three-layer structure, in which a set forming the feed spacer is formed in a three-layer structure, so that the set, which is in contact with a reverse osmosis membrane, convects raw water to a center of the structure of the feed spacer and a laminar flow velocity gradient is generated at the center to decrease a polarization phenomenon of a reverse osmosis filter module and minimize pressure loss, and a reverse osmosis membrane filter module including the feed spacer.

5 Claims, 4 Drawing Sheets

(51) Int. Cl.
 *B01D 61/08* (2006.01)
 *B01D 61/10* (2006.01)
 *C02F 1/44* (2006.01)
 *C02F 103/08* (2006.01)

(52) U.S. Cl.
 CPC ........ *C02F 1/441* (2013.01); *B01D 2313/143* (2013.01); *C02F 2103/08* (2013.01)

(58) Field of Classification Search
 CPC .................. C02F 1/441; C02F 2103/08; C02F 2301/022; C02F 2201/002
 See application file for complete search history.

(56) References Cited

U.S. PATENT DOCUMENTS

| | | | |
|---|---|---|---|
| 6,881,336 | B2 | 4/2005 | Johnson |
| 8,361,318 | B2 | 1/2013 | Chikura et al. |
| 9,724,646 | B2 | 8/2017 | Okamoto et al. |
| 2009/0014359 | A1* | 1/2009 | Den Boestert ......... C10G 31/11 208/309 |
| 2011/0120931 | A1 | 5/2011 | Meyer-Blumenroth et al. |
| 2013/0341264 | A1* | 12/2013 | Kidwell ............... B01D 63/103 210/321.83 |
| 2015/0144550 | A1 | 5/2015 | Okamoto et al. |
| 2015/0314231 | A1 | 11/2015 | Bowen et al. |
| 2015/0375173 | A1 | 12/2015 | Steen |
| 2017/0050149 | A1 | 2/2017 | Jons et al. |
| 2018/0207586 | A1 | 7/2018 | Choi et al. |
| 2018/0250637 | A1 | 9/2018 | Jons |

FOREIGN PATENT DOCUMENTS

| | | |
|---|---|---|
| FR | 2409073 | 6/1979 |
| JP | H06-312133 | 11/1994 |
| JP | H10309445 | 11/1998 |
| JP | H11-235520 | 8/1999 |
| JP | 3690012 | 8/2005 |
| JP | 2005-305422 | 11/2005 |
| JP | 2009-050759 | 3/2009 |
| JP | 2009-061352 | 3/2009 |
| JP | 4688140 | 5/2011 |
| JP | 2013-010086 | 1/2013 |
| JP | 2016-022399 | 2/2016 |
| KR | 20-0379549 | 3/2005 |
| KR | 10-2007-0031279 | 3/2007 |
| KR | 10-0976074 | 8/2010 |
| KR | 10-2010-0129841 | 12/2010 |
| KR | 10-2017-0038646 | 4/2017 |
| WO | 2014-003170 | 1/2014 |
| WO | 2017-058496 | 4/2017 |

OTHER PUBLICATIONS

Schwinge, et al., "Novel spacer design improves observed flux," Journal of Membrane Science 229 (2004) 53-61.
Lee, et al., "The potential to enhance membrane module design with 3D printing technology," Journal of Membrane Science 499 (2016) 480-490.
Office Action of Japanese Patent Office in Appl'n No. 2019-561886, dated Aug. 31, 2021.
Da Costa, A.R. et al., "Optimal Channel Spacer Design for Ultrafiltration," Journal of Membrane Science 62(3):275-291 (1991).
Office Action of Japanese Patent Office in Appl'n No. 2019-561886, dated Feb. 22, 2022.

* cited by examiner

FEED SPACER HAVING THREE-LAYERED STRUCTURE, AND REVERSE OSMOSIS MEMBRANE FILTER MODULE INCLUDING SAME

CROSS-REFERENCE TO RELATED APPLICATION(S)

This application is a National Stage Application of International Application No. PCT/KR2018/012230 filed on Oct. 17, 2018, which claims priority to and the benefit of Korean Patent Application No. 10-2017-0136495 filed in the Korean Intellectual Property Office on Oct. 20, 2017, the entire contents of which are incorporated herein by reference.

TECHNICAL FIELD

The present invention relates to a feed spacer, and more particularly, to a feed spacer having a three-layer structure, in which a set forming the feed spacer is formed in a three-layer structure, so that the set, which is in contact with a reverse osmosis membrane, convects raw water to a center of the structure of the feed spacer and a laminar flow velocity gradient is generated at the center to decrease a polarization phenomenon of a reverse osmosis filter module and minimize pressure loss, and a reverse osmosis membrane filter module including the same.

BACKGROUND

As global warming deepens water shortage, a water purification technology, which is an alternative water resource securing technology, is attracting attention.

Accordingly, it is expected that a water treatment process using a reverse osmosis membrane, which is a core technology of a next-generation water supply business utilizing alternative water resources, such as seawater desalination and reuse of water, leads a water industry market.

Water penetrating the reverse osmosis membrane becomes pure water or water close to infinitely pure water and is used in various fields, such as sterilized water for medical use, purified water for artificial dialysis, or water for manufacturing a semiconductor in an electronic industry.

Herein, reverse osmosis separates two solutions having a concentration difference with a semipermeable membrane, and generates a predetermined water level difference while a solution having a lower concentration moves to a solution having a higher concentration after a certain period of time, which is called an osmotic phenomenon. Further, the difference of the water level generated during the process refers to a reverse osmosis pressure. A device, which makes only water molecules pass the semipermeable membrane by using the principle thereof and purifies water, is referred to as reverse osmosis equipment, and the semipermeable membrane included in the reverse osmosis equipment is a reverse osmosis filter module.

The reverse osmosis filter module includes a center tube, a feed spacer, a reverse osmosis (RO) membrane, a tricot filtered water path, and the like.

Among them, the feed spacer serves as a passage, through which raw water is introduced. In the case where raw water is introduced through the feed spacer, when differential pressure is generated due to flow interruption by the feed spacer, this causes an increase in energy cost, so that as the differential pressure is low, efficiency of the reverse osmosis filter module is increased.

In the meantime, a concentration polarization phenomenon is essentially generated in the vicinity of the reverse osmosis membrane by water permeation flux, and as the concentration polarization phenomenon is intensified, an osmosis pressure is increased in the vicinity of the reverse osmosis membrane, so that a water permeation ratio is decreased.

In relation to this, there is a need for a feed spacer, which is capable of increasing efficiency of a reverse osmosis filter module by mitigating a concentration polarization phenomenon by decreasing the generation of differential pressure.

DETAILED DESCRIPTION

Technical Problem

The present invention is conceived to solve the foregoing problems, and an object of the present invention is to provide a feed spacer having a three-layer structure, which is formed of a layer, which is in direct contact with a reverse osmosis membrane, and a layer, which is not in direct contact with a reverse osmosis membrane, so that a thickness of a strand causing pressure loss of a fluid is decreased.

Another object of the present invention is to provide a feed spacer having a three-layer structure, in which raw water is convected to a center of a structure of the spacer, so that turbulent convection is locally generated only in a layer, which is in direct contact with a reverse osmosis membrane, and a laminar flow velocity gradient is generated at the center of the structure of the spacer to decrease a polarization phenomenon.

Technical Solution

An exemplary embodiment of the present invention provides a feed spacer having a three-layer structure, including: a first set, in which a plurality of strands is positioned in parallel; a second set, which crosses the first set, and is formed of a plurality of parallel strands; and a third set, which is positioned in parallel to a direction of raw water and is formed of a plurality of parallel strands, in which the third set is positioned between the first and second sides or at one side of any one of the first and second sets.

In an exemplary embodiment, strand per inch (SPI) can be 5 to 9.

In an exemplary embodiment, a length between cross points of the first and second sets can be 3,800 μm to 12,000 μm.

In an exemplary embodiment, an angle between the first and second sets can be 50° to 90°.

In an exemplary embodiment, the strand can have a diameter of 167 μm to 300 μm.

In an exemplary embodiment, the feed spacer can have a thickness of 500 μm to 900 μm.

Another exemplary embodiment of the present invention provides a reverse osmosis filter module including the feed spacer having the three-layer structure.

In an exemplary embodiment, the reverse osmosis filter module can include: a tube including an opening accommodating a permeating liquid in a longitudinal direction; and one or more reverse osmosis membranes, which are extended from the tube in an outside direction and are wound around a circumference of the tube, and the spacer is in contact with the one or more reverse osmosis membranes and is wound around the circumference of the tube.

In an exemplary embodiment, the spacer can be formed of a first to third sets, and the first and second sets can be in contact with the one or more reverse osmosis membranes, and the third set may not be in contact with the one or more reverse osmosis membranes.

Advantageous Effects

According to the present invention, the feed spacer is formed of a layer, which is in direct contact with a reverse osmosis membrane, and a layer, which is not in contact with a reverse osmosis membrane, so that a turbulent flow of raw water is concentrated to a center of the structure of the spacer, thereby achieving an effect in that pressure loss is minimized.

Further, according to the present invention, raw water is convected to the center of the structure of the spacer, so that turbulent convection is locally generated only in the layer, which is in direct contact with the reverse osmosis membrane, and a laminar flow velocity gradient is generated at the center of the structure of the spacer, thereby achieving an effect in that a polarization phenomenon is decreased.

MODE FOR CARRYING OUT THE INVENTION

Figure 1:
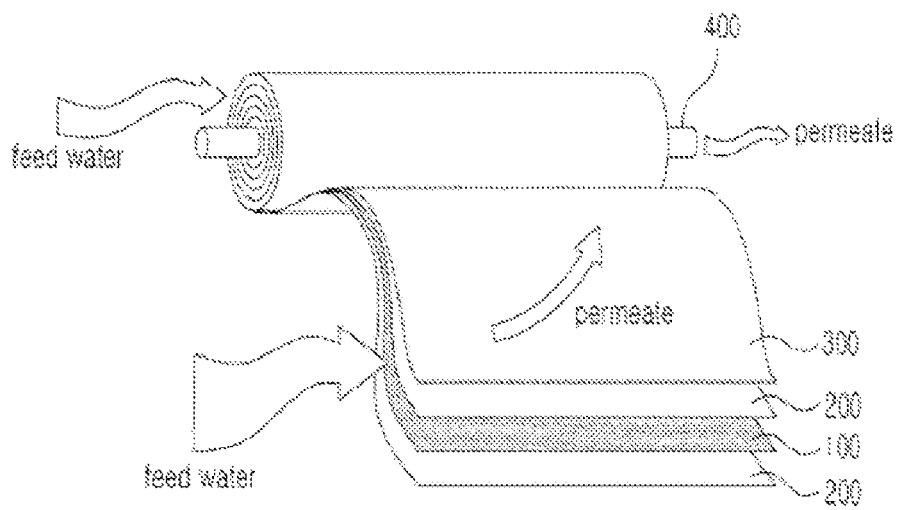
FIG. 1 is a perspective view of a reverse osmosis filter module according to an exemplary embodiment of the present invention.

The present invention will be described in detail with reference to the accompanying drawings. Herein, repeated description, and a detailed description of a publicly known function and configuration which may unnecessarily make the main point of the present invention be unclear will be omitted. Exemplary embodiments of the present invention are provided for more completely explaining the present invention to those skilled in the art. Accordingly, shapes, sizes, and the like of the elements in the drawings may be exaggerated for clear description.

In the entire specification, unless explicitly described to the contrary, when it is said that a part "comprises/includes" a constituent element, this means that another constituent element may be further "included/comprised", not that another constituent element is excluded.

Hereinafter, an exemplary embodiment is presented for helping understanding of the present invention. However, the exemplary embodiment below is simply provided for easier understanding of the present invention, and the contents of the present invention are not limited by the exemplary embodiment.

<Feed Spacer>

Figure 2A:
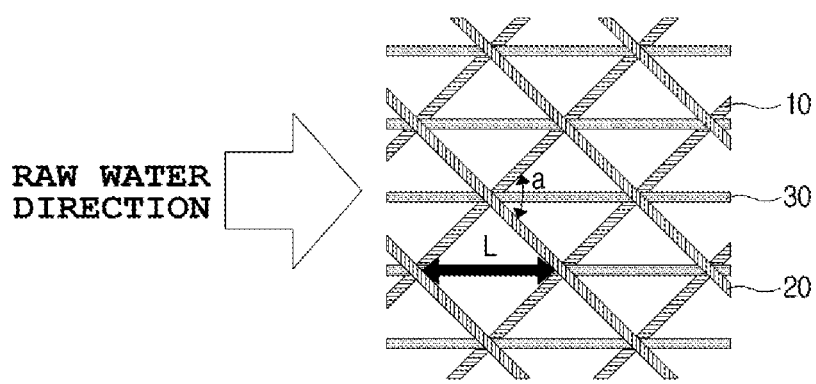
FIG. 2A is a top plan view of a feed spacer having a three-layer structure according to an exemplary embodiment of the present invention.
Figure 2B:
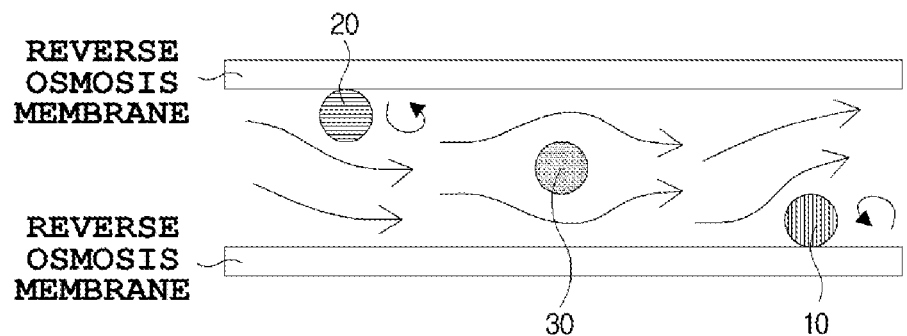
FIG. 2B is a cross-sectional view of a reverse osmosis filter module, in which reverse osmosis membranes are positioned at one side and the other side of the feed spacer having the three-layer structure according to an exemplary embodiment of the present invention.
Figure 3:
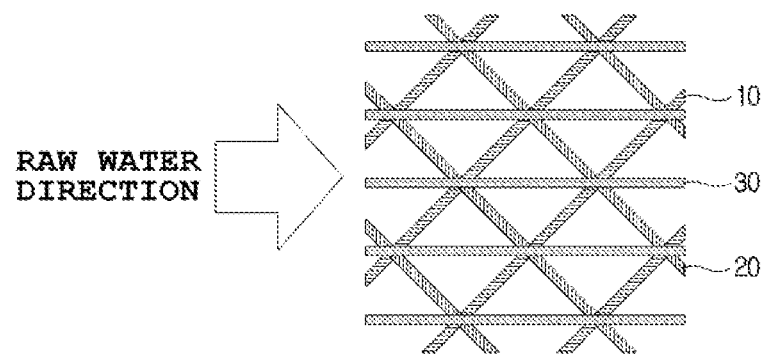
FIG. 3 is a cross-sectional view of a feed spacer having a three-layer structure according to another exemplary embodiment of the present invention.
Figure 4A:
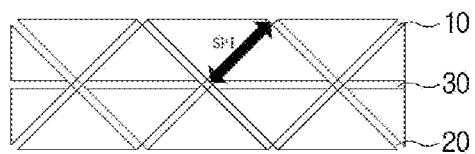
FIG. 4A is a top plan view of a feed spacer having a three-layer structure, in which strand per inch (SPI) is 9, according to an exemplary embodiment of the present invention.
Figure 4B:
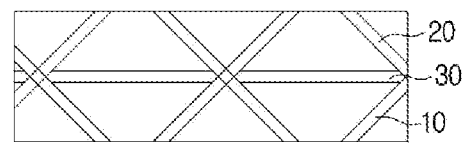
FIG. 4B is a top plan view of a feed spacer having a three-layer structure, in which SPI is 7, according to an exemplary embodiment of the present invention.

FIG. 2A is a top plan view of a feed spacer having a three-layer structure according to an exemplary embodiment of the present invention, and FIG. 2B is a cross-sectional view of a reverse osmosis filter module, in which reverse osmosis membranes are positioned at one side and the other side of the feed spacer having the three-layer structure according to an exemplary embodiment of the present invention. FIG. 3 is a cross-sectional view of a feed spacer having a three-layer structure according to another exemplary embodiment of the present invention. FIG. 4A is a top plan view of a feed spacer having a three-layer structure, in which strand per inch (SPI) is 9, according to an exemplary embodiment of the present invention, and FIG. 4B is a top plan view of a feed spacer having a three-layer structure, in which SPI is 7, according to an exemplary embodiment of the present invention. The feed spacer according to the present invention can include a first set 10, a second set 20, and a third set 30, in which a plurality of strands is positioned in parallel.

In the first set 10, one or more, that is, the plurality of strands can be positioned in parallel, and herein, the strand can be positioned to be inclined to a direction of raw water. Further, the second set 20 can be positioned to cross the first set 10. Further, a direction of inclination of the second set 20 is opposite to the direction of inclination of the first set 10, so that the first set 10 and the second set 20 can be provided in a lattice shape.

Further, the first set 10 can be positioned at an angle a of 10° to 80° to a flow direction of raw water, and the second set 20 can be positioned at an inclination of 100° to 170° to a flow direction of raw water. Further, the angle a between the first set 10 and the second set 20 can be 50° to 90°.

For example, when the strand of the first set 10 is inclined 60° with respect to the flow direction of the raw water, the strand of the second set 20 can be positioned while being inclined 110° to 150° with respect to the flow direction of the raw water.

That is, when the angle between the first set 10 and the second set 20 is 50°, and the strand of the first set 10 is inclined 60° with respect to the flow direction of the raw water, the strand of the second set 20 can be positioned while being inclined 110° with respect to the flow direction of the raw water.

In this case, when the angle between the first set 10 and the second set 20 is less than 50°, a gap with the third set 30, which is to be described below, is decreased, so that a cross sectional area of a flow path formed by the strands is decreased and a laminar flow velocity gradient is not generated at a center portion of the feed spacer, thereby causing a problem in that a polarization phenomenon is increased, and when the angle between the first set 10 and the second set 20 is larger than 90°, a gap with the third set 30 is increased, so that the cross sectional area of the flow path is increased and raw water actively flows in up and down directions, thereby causing a problem in that pressure loss is increased. Herein, the flow path can be formed by the strands forming each set, and may mean a space between reverse osmosis membranes positioned in an upper portion and a lower portion of the feed spacer and each set.

The third set 30 according to the present invention is positioned in parallel to a flow direction of raw water, and can be positioned between the first set 10 and the second 20 or at the topmost side among the three sets. That is, the third set can be positioned at any one position of one side of the first set 10 and one side of the second set 20. More particularly, when the second set 20 is positioned in an upper portion of the first set 10 according to a set lamination order, the third set 30 can be positioned at one side, that is, an upper portion, of the second set 20. When the first set 10 is positioned in an upper portion of the second set 20 according to a set lamination order, the third set 30 can be positioned in the upper portion of the first set 10.

First, referring to FIG. 2B, when the third set 30 is positioned at one side of the first set 10 and the other side of the second set 20, the feed spacer can be formed of the set, which is in direct contact with the reverse osmosis membrane, and the set, which is not in contact with the reverse osmosis membrane. More particularly, the feed spacer has the structure, in which the third set 30 is not in direct contact with the reverse osmosis membrane, and the first set 10 and the second set 20 are in contact with the reverse osmosis membrane.

The first set 10 and the second set 20 are in contact with the reverse osmosis membrane to serve to support the structure of the feed spacer, and can periodically convect an interface flow of raw water between the reverse osmosis membranes to the center of the structure of the feed spacer. That is, the feed spacer according to the present invention convects the interface flow of raw water to the third set 30, so that the third set 30 generates a laminar flow velocity gradient of the interface flow to achieve an effect in that a polarization phenomenon is decreased.

Further, the third set 30 can be provided at a cross point of the first set 10 and the second set 20 or any one position among the 1/5 to 4/5 points between the cross points.

The feed spacer according to the present invention can be manufactured by a fusion method. The feed spacer can be manufactured by a method of extruding the first set 10, the second set 20, and the third set 30 in the state where the first set 10, the second set 20, and the third set 30 are bonded, or extruding the first set 10 and the third set 30 in the state where the first set 10 and the third set 30 are bonded or extruding the second set 20 and the third set 30 in the state where the second set 20 and the third set 30 are bonded, and then laminating and bonding the second set or the first set.

Next, referring to FIG. 3, when the third set 30 is positioned at one side of the second set 20, the third set 30 positioned at the topmost side is parallel to the flow direction of the raw water to serve to separate the flow in half. Accordingly, the first set 10, which is in direct contact with the reverse osmosis membrane, convects the interface flow of the raw water to the second set 20 and the third set 30 separates the raw water in half to convect the raw water to the second set 20, so that the convection phenomenon is periodically generated in the vicinity of the interface of the reverse osmosis membrane, thereby minimizing pressure loss in the feed spacer according to the present invention.

A gap between the strands forming the first to third sets 10, 20, and 30 according to the present invention can be 4 mm to 12 mm. Herein, when the gap between the strands is less than 4 mm, a cross sectional area of the flow is increased and the gap between the strands of each layer is decreased, so that there is a problem in that a turbulent flow of the raw water is generated more than needs and pressure loss is increased. Further, when the gap between the strands is more than 12 mm, the gap between the strands is increased and a section, in which a vertical flow of the raw water is not generated, is generated, so that there is a problem in that the laminar flow velocity gradient is not generated.

In the first to third sets 10, 20, and 30 according to the present invention, a diameter of the strand forming each set can be 167 μm to 300 μm, and thus a thickness of the feed spacer can be 500 μm to 900 μm. The diameter of the strand forming the feed spacer according to the present invention can be provided to be smaller than the diameter of the strand forming the feed spacer in the related art, and when the diameter of the strand is decreased, an area of the strand, which is in contact with the fluid supplied to the feed spacer, is decreased, so that there can be an effect in that pressure loss of the fluid due to friction is decreased.

When the diameter of the strand is less than 167 μm and the thickness of the feed spacer is less than 500 μm, there can be a problem in that the structure of the feed spacer cannot be supported. Further, when the diameter of the strand is more than 300 μm and the thickness of the feed spacer is more than 900 μm, an area of the strand, which is in contact with the supplied raw water, is increased, so that there can be a problem in that resistance is increased and pressure loss of the feed spacer is increased.

Further, the diameter of the strand according to the present invention is decreased compared to the diameter of the strand forming the feed spacer in the related art, so that it is possible to secure a void fraction of a channel, in which the raw water can flow, and an effective reverse osmosis membrane area, thereby achieving an effect in that differential pressure is improved and a property of produced water is improved.

In the feed spacer according to the present invention, the SPI can be 5 to 9. That is, a length L between the cross points formed by crossing the first set 10 and the second set 20 can be 3,800 μm to 12,000 μm. Herein, the SPI can mean the number of strands corresponding to one side of the flow path per inch. That is, the SPI can mean the number of strands between the cross points formed by crossing the first set 10 and the second set 20 and the third set 30.

When the SPI is less than 5 and the length between the cross points is more than 12,000 μm, the cross sectional area of the flow path is decreased and the laminar flow velocity gradient is not generated at the center portion of the feed spacer, so that there can be a problem in that the polarization phenomenon is increased, and when the SPI is more than 9 and the length between the cross points is less than 3,800 μm, the cross sectional area of the flow path is increased and the raw water actively flows in the up and down directions, so that there can be a problem in that pressure loss is increased.

<Reverse Osmosis Filter Module>

FIG. 1 is a perspective view of a reverse osmosis filter module according to an exemplary embodiment of the present invention. The reverse osmosis filter module is a constituent element of a membrane separation device, which serves to purify actually supplied water by using a reverse osmosis pressure principle. The reverse osmosis filter module can include a reverse osmosis membrane 200, a feed spacer 100, a tricot filtered water path 300, and a tube 400 including an opening accommodating a permeating liquid according to a longitudinal direction. Further, the reverse osmosis filter module can further include one pair of telescoping preventing devices (not illustrated), but a detailed description of the telescoping preventing device will be omitted.

One or more reverse osmosis membranes 200 filter foreign materials included in water by using osmosis and serve as a flow path allowing purified water to effectively flow. The one or more reverse osmosis membranes are extended to an outside direction from the tube and are wound around a circumference of the tube.

As the feed spacer 100, the feed spacer 100 according to the present invention can be provided. More particularly, the feed spacer 100 can be provided in a three-layer structure, and herein, the three layer refers to a structure, in which three strands forming the feed spacer 100 are laminated, and can mean the form in which the plurality of strands is positioned in parallel to form a set of one layer and the three sets are laminated.

The feed spacer 100 is provided in the three-layer structure, so that the set, which is in contact with the reverse osmosis membrane 200, is divided from the set that is not in contact with the reverse osmosis membrane 200. In the exemplary embodiment, the first and second sets can be in contact with one or more reverse osmosis membranes 200, and the third set may not be in contact with one or more reverse osmosis membranes 200. The set, which is in contact with the reverse osmosis membrane 200, can convect a flow direction of raw water supplied to the reverse osmosis filter module to the center of the feed spacer 100, that is, the set, which is not in contact with the reverse osmosis membrane 200. Accordingly, the laminar flow velocity gradient is generated in the portion, in which the set, which is not in contact with the reverse osmosis membrane 200, is positioned, and the turbulent current is locally generated only in the portion, in which the set, which is in contact with the reverse osmosis membrane 200, is positioned, so that the polarization phenomenon of the feed spacer 100 is decreased and pressure loss is decreased, thereby more improving efficiency of the reverse osmosis filter module.

The feed spacer 100 forms a passage, through which raw water is introduced from the outside, and serves to maintain a gap between one reverse osmosis membrane 200 and another reverse osmosis membrane 200. To this end, the feed spacer 100 is in contact with one or more reverse osmosis membranes 200 at an upper side and a lower side, and is wound around a circumference of the tube, similar to the one or more reverse osmosis membranes 200.

Herein, a material of the feed spacer 100 is not specially limited, but can include any one of polyethylene, polyvinyl chloride, polyester, and polypropylene.

The tricot filtered water path 300 has a structure of a general fabric form, and serves as a flow path making a space, through which the water purified through the reverse osmosis membrane 200 can flow out.

The tube 400 is positioned at a center of the reverse osmosis filter module, and serves as a passage, through which the filtered water is introduced and discharged.

To this end, voids (or openings) having a predetermined size can be formed at an external side of the tube 400 so that the filtered water is introduced. In this case, it is preferred that the number of voids formed can be one or more so that the filtered water is more effectively introduced.

Comparative Examples

The feed spacer in the related art has a two-layer structure and includes only a first set and a second set. Comparative Example 1 is a feed spacer having a two-layer structure, in which SPI is 9, a length between the cross points is 3,889 μm, an angle between a flow direction of a flow path and a first set and a second set is 90°, and Comparative Example 2 is a feed spacer having a two-layer structure, in which SPI is 7, a length between the cross points is 5,000 μm, an angle between a flow direction of a flow path and a first set and a second set is 90°.

Examples

Examples 1 to 4 are feed spacers having three-layer structures according to the present invention, and in Examples 1 to 3, a third set is positioned at a middle portion between a first set and a second set. Examples 1 to 3 are the feed spacers having the three-layer structures, in which angles between flow directions of flow paths and the first sets and the second sets are 50°, 55°, and 90°, and SPIs are 9, 7, and 5, respectively. Example 4 has the structure, in which a third set is positioned at the topmost side of the feed spacer. Example 4 is the feed spacer, in which SPI is 9 and an angle between a flow direction of a flow path and a first set and a second set is 90°.

TABLE 1

| | Characteristic | | | | | |
|---|---|---|---|---|---|---|
| | Structure and SPI | Flow direction angle | ΔP/length (Pa/μm) | Recovery length | Cross_L (μm) | ΔP |
| Example 1 | 9SPI | 50 | 0.01442 | 7.81.E−05 | 6507 | Decrease by 68% |
| | | 55 | 0.0156 | 7.75.E−05 | 5955 | Decrease by 67% |
| | | 90 | 0.02051 | 7.77.E−05 | 3889 | Decrease by 55% |
| Example 2 | 7SPI | 50 | 0.01107 | 7.91.E−05 | 8366 | Decrease by 76% |
| | | 55 | 0.01140 | 7.95.E−05 | 7657 | Decrease by 75% |
| | | 90 | 0.01504 | 7.88.E−05 | 5000 | Decrease by 67% |
| Example 3 | 5SPI | 50 | 0.00856 | 8.04.E−05 | 111712 | Decrease by 81% |
| | | 55 | 0.00878 | 8.06.E−05 | 10720 | Decrease by 81% |
| | | 90 | 0.0109 | 8.10.E−05 | 7000 | Decrease by 76% |
| Example 4 | 9SPI | 90 | 0.0280 | 7.73.E−05 | 3889 | Decrease by 39% |
| Comparative Example 1 | 9SPI | 90 | 0.0456 | 7.90.E−05 | 3889 | Reference |
| Comparative Example 2 | 7SPI | 90 | 0.0335 | 7.90.E−05 | 5000 | Decrease by 27% |

Differential pressure (Pa/μm) per length of the feed spacer of Example 1 is 0.02051, which is decreased by 0.0456 compared to Comparative Example 1, so that total pressure of the feed spacer is decreased by 55% compared to Comparative Example 1. That is, it can be seen that in the three-layer structure, pressure generated between raw water and the feed spacer is decreased compared to the two-layer structure.

Further, it can be seen that when the SPI is the same and the flow direction angle is decreased, differential pressure per length is decreased and a decrease in differential pressure in the whole feed spacer is increased.

In the forgoing, the present invention has been described with reference to an exemplary embodiment of the present invention, but those skilled in the art may appreciate that the present invention may be variously corrected and changed within the range without departing from the spirit and the area of the present invention described in the appending claims.

The invention claimed is:

1. A feed spacer having a three-layer structure, comprising:
   a first set, in which a plurality of strands is positioned in parallel;
   a second set, which crosses the first set forming cross points, and is formed of a plurality of parallel strands; and
   a third set, which is positioned in parallel to a flow direction of raw water and is formed of a plurality of parallel strands,
   wherein the third set is positioned between the first and second sets,
   wherein a gap between the strands forming the first set, second set, and third set is from 11 to 12 mm,
   wherein a length between cross points of the first and second sets is 10,720 μm to 12,000 μm,
   wherein an angle between the strands of the first set and strands of the second set is 50° to 55°; and
   wherein the feed spacer has a thickness of 500 μm to 900 μm.

2. The feed spacer of claim 1, wherein a diameter of the strands forming each of the first set, the second set, and the third set is 167 μm to 300 μm.

3. A reverse osmosis filter module, comprising the feed spacer of claim 1.

4. The reverse osmosis filter module of claim 3, wherein the reverse osmosis filter module includes:
   a tube including an opening accommodating a permeating liquid in a longitudinal direction; and
   one or more reverse osmosis membranes, which are extended from the tube in an outside direction and are wound around a circumference of the tube, and
   the spacer is in contact with the one or more reverse osmosis membranes and is wound around the circumference of the tube.

5. The reverse osmosis filter module of claim 4, wherein the spacer is formed of the first to third sets, and the first and second sets are in contact with the one or more reverse osmosis membranes, and the third set is not in contact with the one or more reverse osmosis membranes.

* * * * *